United States Patent [19]

Salmon

[11] 4,192,787
[45] Mar. 11, 1980

[54] WATER BASED POLYVINYLCHLORIDE DISPERSION COATING COMPOSITION STABILIZED WITH IRON CARBOXYLATES

[75] Inventor: Howard J. Salmon, Cornwells Heights, Pa.

[73] Assignee: Mobil Oil Corporation, New York, N.Y.

[21] Appl. No.: 892,348

[22] Filed: Mar. 31, 1978

[51] Int. Cl.² .................. C08L 91/00; C08L 61/24; C08L 61/26
[52] U.S. Cl. .................. 260/21; 260/23 XA; 260/45.75 P; 260/45.85 R; 260/29.4 UA; 428/460; 428/463
[58] Field of Search .............. 260/29.4 UA, 29.6 NR, 260/29.6 RB, 45.75 P, 45.85 R, 21, 23 XA, 853, 851

[56] References Cited

U.S. PATENT DOCUMENTS

| 3,142,659 | 7/1964 | Buckley | 260/45.75 P |
| 3,939,163 | 2/1976 | Ramey et al. | 260/45.75 P |
| 4,116,905 | 9/1978 | Davis | 260/22 CB |

Primary Examiner—Theodore E. Pertilla
Attorney, Agent, or Firm—Charles A. Huggett; Hastings S. Trigg

[57] ABSTRACT

There is provided a coating composition comprising polyvinylchloride homopolymer or copolymer dispersed in an aqueous solution of solubilized carboxyl functional acrylic resin, a triazine-formaldehyde crosslinking resin, and a metal carboxylate stabilizer such as iron neodecanoate.

5 Claims, 1 Drawing Figure

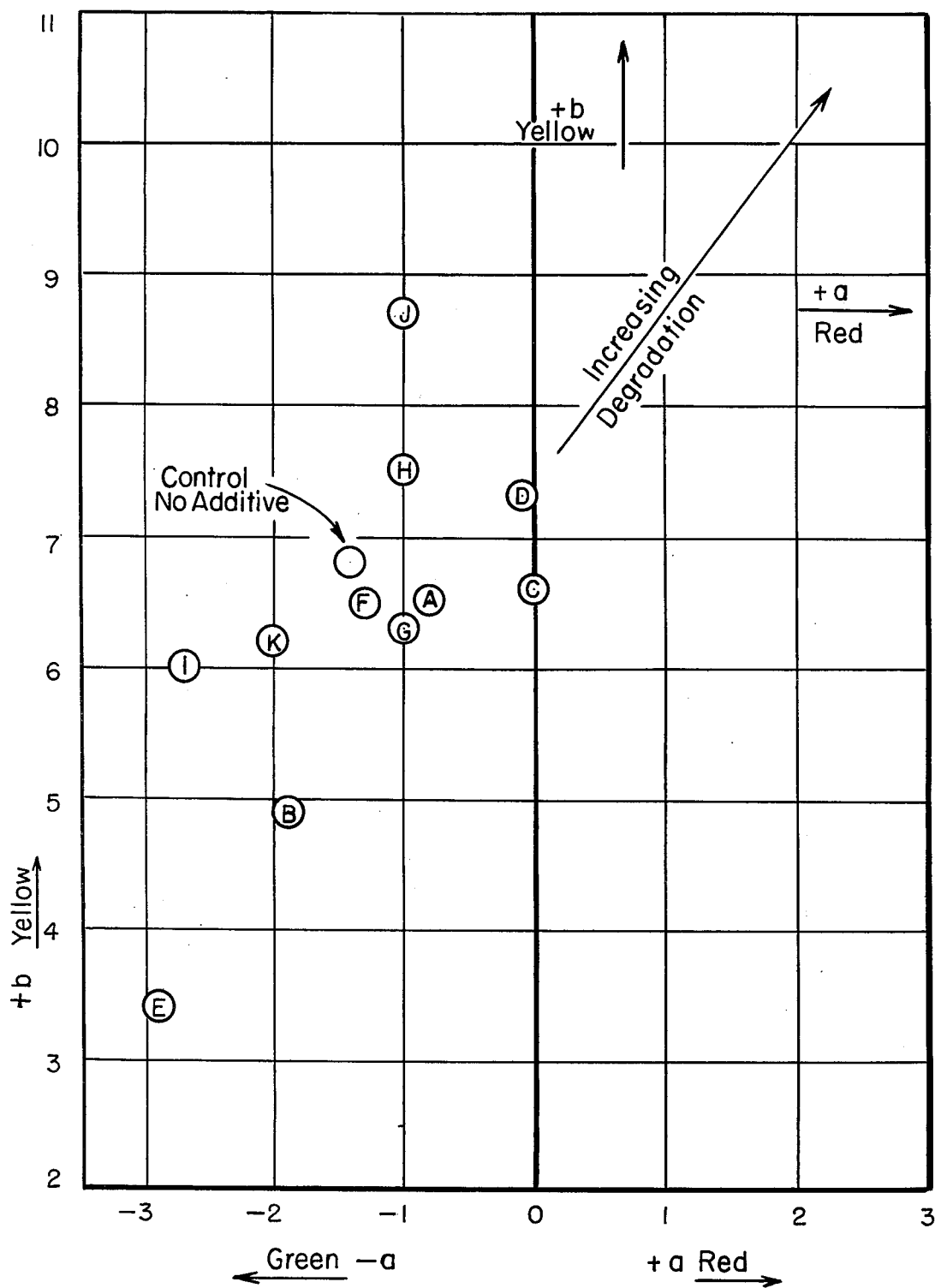

WATER BASED POLYVINYLCHLORIDE DISPERSION COATING COMPOSITION STABILIZED WITH IRON CARBOXYLATES

BACKGROUND OF THE INVENTION

1. Field of the Invention

This application is concerned with aqueous PVC dispersion coating formulations stabilized against heat degradation.

2. Description of the Prior Art

In copending application Ser. No. 782,201, filed March 28, 1977, now U.S. Pat. No. 4,116,905 there is disclosed an aqueous solution of water-dilutable resin, solubilized with ammonia or an amine, into which is dispersed PVC. This dispersion can be admixed with an aminoplast, applied to a substrate, and heat cured. It has been found, however, that as a result of heat curing at elevated temperatures (375°–750° F.) the film becomes badly discolored and film properties are relatively poor.

It is the discovery of this invention that such heat discoloration can be prevented by incorporating into the PVC dispersion formulation a small amount of an iron carboxylate.

SUMMARY OF THE INVENTION

This invention provides a water-based coating formulation comprising powdered polyvinyl chloride or copolymers of vinyl chloride dispersed in a solution of water-dilutable acrylic resin having functional carboxyl groups, water-solubilized with ammonia, $NH_4OH$, or amine solubilizer, in water, a mixture of water and a monohydric alcohol or an ether alcohol, or a mixture of water, a monohydric alcohol, and an ether alcohol, an aminoplast, and a minor amount of an iron carboxylate.

DESCRIPTION OF THE DRAWING

The FIGURE shows the relationship between the Hunter scale a and b values for heat cured coatings obtained from PVC formulations containing different metal carboxylates and the relative color degradation resulting from each metal carboxylate, as measured on the Hunter Color Difference Meter.

DESCRIPTION OF SPECIFIC EMBODIMENTS

In preparing the coating formulations of this invention, generally there is prepared a solution of water-dilutable acrylic resin in an aqueous solution. To this solution there is added polyvinylchloride in powder form, as well as other components, so that it is dispersed in the aqueous solution.

The water-dilutable acrylic resin can be any acrylic resin that has carboxyl functionality. Such resins include copolymers of acrylic acid or methacrylic acid with acrylate esters or methacrylate esters and can also contain small amounts of styrene monomer. Polyacrylic acid and polymethacrylic acid are also contemplated. In general, the copolymers will contain at least 10 to 20 weight percent acrylic acid or methacrylic acid. A typical copolymer can contain methyl methacrylate/ethyl acrylate/acrylic acid in the proportions: 0–80/1–85/10–20 in parts by weight. The carboxyl functional acrylic resins contemplated herein are well known in the art and are generally available commerically.

The water-dilutable acrylic resin is solubilized with ammonia, $NH_4OH$, or amines such as lower alkyl and/or alkylol amines. Typical amines include dimethylamine, trimethylamine, ethylamine, diethylamine, triethylamine, propylamine, dipropylamine, triisopropylamine, ethanolamine, isopropanolamine, dipropanolamine and dimethylethanolamine.

The solvent or vehicle used in the formulations of this invention are water or mixtures of water and a monohydric alcohol or ether alcohol or mixtures of water, alcohol and ether alcohol. Utilizable monohydric alcohols include methanol, ethanol, n-propanol, isopropanol, n-butanol, isobutanol, t-butanol, and isooctanol. The ether alcohols include methoxyethanol, ethoxyethanol, butoxyethanol and hexoxyethanol, and 1-methoxy-2-propanol. The amount of monohydric alcohol and/or ether alcohol will be between about 5 and about 30 wt.% of the total solvent mixture.

The preferred vinyl polymer, because of wide availability and acceptability is polyvinylchloride. The polyvinylchloride is a dispersion resin available in finely divided powder form. In general, the particle size will be such as to pass a 40 mesh sieve and will be retained on 200 mesh sieve (U.S. sieve series). Copolymers of vinyl chloride and other monomers, such as vinyl acetate, are contemplated. Such copolymers are well known in the art and will contain up to about 10% comonomer.

The weight ratio of PVC to water-dilutable acrylic resin will be between about 15:1 and about 1:1, preferably between about 10:1 and about 1:1. The total solids content in the finished coating (PVC+water-dilutable resin) will be between about 15 and about 65 weight percent.

The preferred aminoplasts are the triazinealdehyde resins, such as hexamethoxymethylmelamine; methanol-/ethanol, methanol/butanol, or butanol alkylated melamine-formaldehyde resins; benzoguanamine-formaldehyde resins; and methanol and/or ethanol alkylated benzoguanamine-formaldehyde resins. Also contemplated are other aminoplasts, such as the urea-formaldehyde resins. These aminoplasts are well known in the art and they are commercially available. In general, the aminoplast will comprise about 1–4 weight percent of the finished coating formulation.

The coating formulation is stabilized during heat curing by the inclusion of 0.1–3 weight percent of an iron carboxylate. Suitable salts include iron naphthenate, iron neodecanoate, iron octoate, and iron tallate.

Although not essential, it is possible to use an acid cross-linking catalyst. Suitable catalysts include acid phosphates, such as methyl acid phosphate and butyl acid phosphate; acid pyrophosphates, such as dimethyl acid pyrophosphate; organic acid sulfate esters; and organic sulfonic acids, such as p-toluene-sulphonic acid. Preferred catalysts are the acid phosphate and the acid sulfate esters of alkylphenoxypoly(ethyleneoxy)-ethanol that are known as anionic surfactants. The acid catalysts can be used, for instance, in the form of amine or ammonium salts, in amounts of 0.1–2 weight percent of the formulation.

The coating formulation is prepared by adding the PVC powder and other components to the solution of water-dilutable acrylic resin with stirring. Alternatively the PVC powder may be combined with the water dilutable acrylic resin or resins and the other components prior to neutralization and water addition. The resultant formulation is a suspension of PVC particles in the solution. Typical techniques for preparing the PVC suspension coating formulation are set forth in the following examples. All parts in this specification and claims are by weight percent.

EXAMPLE 1

A reaction vessel was charged with 9.6 parts of acrylic resin copolymer (85 parts ethyl acrylate/15 parts acrylic acid; 85 weight percent solids in 1:1 weight butoxyethanol:hexoxyethanol), 1.3 parts ammonium hydroxide (26° Be.), and 24.6 parts water. The mixture was stirred at a slow speed until the acrylic resin was solubilized. The speed of stirring was gradually increased, as 26.6 parts powdered PVC resin was slowly added. High speed stirring was continued until there was obtained a stable dispersion of PVC in the acrylic resin solution. Then, 2.5 parts benzoguanamine-formaldehyde resin and 0.6 part iron neodecanoate were added. Stirring speed was reduced, while 10.0 parts by water was added.

An aluminum test panel was coated with this dispersion and cured for 8 minutes at 400° F. The coated panel had the following film properties:

| | |
|---|---|
| Dry film thickness | 0.3–0.4 mil |
| Film continuity | <1 ma. |
| Dry adhesion | Excellent |
| Diaphragming | None |
| MEK resistance | |
| (double rubs) | 40 |
| Pasteurization 45 min. 77° C. | |
| Blush | None |
| Adhesion | Excellent |
| Storage stability | >5 months |

EXAMPLE 2

A reaction vessel was charged with 12.1 parts acrylic resin terpolymer (57 parts methyl methacrylate/28 parts ethyl acrylate/15 parts acrylic acid; 65 weight percent solids in 1:1 weight butoxyethanol: hexoxyethanol), 7.2 parts isoctanol, 2.8 parts benzoguanamine-formaldehyde resin, 0.5 part iron naphthenate, 1.4 parts ammonium hydroxide (26° Be.), and 0.4 part organic acid phosphate ester*. The mixture was stirred at slow speed and 26.5 parts water was slowly added. Stirring was continued until the mixture was uniform, then 28.6 parts PVC powder was slowly added as stirring speed was gradually increased. High speed stirring was continued until the dispersion of PVC was uniform. Water (20.4 parts) was slowly added while stirring speed was gradually reduced.

*Mixed mono-and di-acid phosphate ester of nonylphenoxy polyoxyethylene having 44–45 polyoxyethylene units per unit of nonylphenol and an acid no. to 1st inflection point of 90-110 and to 2nd inflection point of 195-200.

An aluminum test panel was coated with this dispersion and cured 8 minutes at 400° F. The coated panel had the following properties:

| | |
|---|---|
| Dry film thickness | 0.3–0.4 mil |
| Film continuity | <1 ma. |
| Adhesion | Excellent |
| Diaphragming | None |
| MEK resistance | |
| (double rubs) | 50 |
| Pasteurization, 45 min. 77° C. | |
| Blush | None |
| Adhesion | Excellent |
| Storage stability | 2 months |

In the examples the following test procedures were used to evaluate films made from the coating formulations of this invention.

Diaphragm Test:—An aluminum test panel is coated with the subject coating at 8–10 milligrams per square inch, cured at 400° F. for 8 minutes, and then immersed in 170° F. water for 45 minutes. It is removed from the water, excess water blotted, and then tested as follows: A "V" is scored on the uncoated side of the panel, top of the "V" at the edge. The "V" is ⅜" wide by 2" long, long dimension runs with the metal grain. The "V" shaped area is then grasped with pliers at the edge and pulled at a constant rate toward the uncoated side until it is totally torn from the panel. The panel is examined in the area of the "V" to determine if unsupported film protrudes into the open area. No film protruding is rated excellent.

Film Continuity:—An aluminum test panel is coated with the subject coating a 8–10 milligrams per square inch, cured at 400° F. for 8 minutes and tested as follows. A coated area equal to that of a can end is used to cover a cup containing an electrolyte solution in which is immersed an electrode. The cup and panel are inverted to bring the electrolyte solution in contact with the coated surface. The other electrode is attached to the metal panel. The current passing through the coating at a specified voltage is measured in microamperes and is directly proportional to the porosity of the coating.

MEK Double Rubs:—A pad of felt (2" square) soaked in MEK (methylethyl ketone) is rubbed back and forth across the coated surface, while the panel is resting on a firm surface. Each stroke is 2½–3" in length at a uniform pressure of about 900 grams and at a rate of about 100 rubs per minute. The pad is resoaked with MEK after 50 double rubs, or before, if increase in friction makes it necessary. One double rub is considered as one back and forth stroke.

Adhesion and Blush—A coated area of the panel is cross-hatched with individual score lines approximately 1/16 inch apart. Scotch tape is firmly applied to the cross-hatched area and removed with a quick snap. Adhesion is rated on a scale of 0 to 10 with 10 representing excellent, i.e., no coating was pulled off with the tape. Blush, i.e., clouding of the film, is rated on a 0 to 10 scale with 10 representing no blush.

Pasteurization—A coated panel is immersed in water for 45 minutes at 77° C. Then, the panel is wiped dry with an absorbent towel and tested for Blush.

EXAMPLE 3

A series of coating formulations (A through K) was prepared as described in Example 1, except for the iron neodecanoate. In each formulation, a different metal carboxylate was used, as set forth in the Table, at a metal concentration of 0.12 weight percent of the weight of PVC. A Control formulation was also prepared containing no metal carboxylate.

Each coating formulation (A through K and Control) was coated onto an aluminum test panel at a dry film thickness of 0.3—0.4 mil and cured for 8 minutes at 400° F. Each panel was evaluated for color degradation of ASTM Designation D-2244, using the Hunter Color Difference Meter. The results are set forth in the Table showing the Hunter a scale (green-red) and the Hunter B scale (blue-yellow). Degradation is manifested by an increase in the red (+a) value and the yellow (+b) value.

TABLE

| Composition | Carboxylate | Hunter Color Difference Meter Values | | |
|---|---|---|---|---|
| | | L | a | +b |
| Control | None | 38.4 | −1.4 | 6.8 |
| A | Magnesium naphthenate | 42.0 | −0.8 | 6.5 |
| B | Stannous stearate | 39.4 | −1.9 | 4.9 |
| C | Lithium naphthenate | 33.9 | 0.0 | 6.6 |
| D | Zirconium octoate | 39.4 | −0.1 | 7.3 |
| E | Iron neodecanoate | 44.0 | −2.9 | 3.4 |
| F | Calcium neodecanoate | 36.6 | −1.3 | 6.5 |
| G | Lithium neodecanoate | 32.0 | −1.0 | 6.3 |
| H | Calcium 2-ethylhexoate | 34.2 | −1.0 | 7.5 |
| I | Cobalt naphthenate | 42.0 | −2.7 | 6.0 |
| J | Manganese neodecanoate | 34.5 | −1.0 | 8.7 |
| K | Cobalt octoate | 39.7 | −2.0 | 6.2 |

The data in the Table are shown graphically in the drawing (FIGURE). This FIGURE shows the relationship between the Hunter scale a and b values for heat cured coatings obtained from formulations containing different metal carboxylates and the relative color degradation resulting from each metal carboxylate used. It will be at once apparent that the iron carboxylate (iron neodecanoate Ⓔ ) is outstanding with regard to inhibiting color degradation in accordance with this invention.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A water-based coating formulation comprising powdered polyvinyl chloride or copolymers of vinyl chloride with other well-known vinyl monomers dispersed in a solution of water-dilutable acrylic resin having functional carboxyl groups, water-solubilized with ammonia, $NH_4OH$, or amine solubilizer, in water, a mixture of water and a monohydric alcohol or an ether alcohol, or a mixture of water, a monohydric alcohol, and an ether alcohol, an aminoplast, and a minor amount of an iron carboxylate selected from the group consisting of iron naphthenate, iron neodecanoate, iron octoate, and iron tallate.

2. A coating composition of claim 1, wherein said acrylic resin is a copolymer of 0–80 parts methyl methacrylate, 1–85 parts ethylacrylate, and 10–20 parts acrylic acid, in parts by weight, and said aminoplast is benzoguanamine-formaldehyde resin.

3. A coating composition of claim 2, wherein said acrylic resin is a copolymer of 85 parts ethyl acrylate and 15 parts acrylic acid, in parts by weight, and said iron carboxylate is iron neodecanoate.

4. A coating composition of claim 2, wherein said acrylic resin is a copolymer of 57 parts methyl methacrylate, 28 parts ethyl acrylate, and 15 parts acrylic acid, in parts by weight, and said iron carboxylate is iron naphthenate.

5. A substrate coated with the formulation of claim 1.

UNITED STATES PATENT AND TRADEMARK OFFICE
CERTIFICATE OF CORRECTION

PATENT NO. : 4,192,787
DATED : March 11, 1980
INVENTOR(S) : Howard J. Salmon

It is certified that error appears in the above-identified patent and that said Letters Patent are hereby corrected as shown below:

Col. 1, Line 13 - Comma should be inserted after "4,116,905"

" 1 " 38 - "a and b values" should be "$\underline{a}$ and $\underline{b}$ values"

" 3 " 17 - "by" should be deleted

" 3 " 52 - "44-45" should be "44-55"

" 4 " 62 - "of" should be "by"

" 4 " 65 - "a scale" should be "$\underline{a}$ scale"

" 4 " 66 - "B scale" should be "$\underline{b}$ scale"

" 4 " 67 - "(+a)" should be "(+$\underline{a}$)"; "(+b)" should be "(+$\underline{b}$)"

" 5 " 19 - "FIGURE" should be "figure"

" 5 " 20 - "a and b values" should be "$\underline{a}$ and $\underline{b}$ values"

Signed and Sealed this

Tenth Day of June 1980

[SEAL]

Attest:

SIDNEY A. DIAMOND

Attesting Officer

Commissioner of Patents and Trademarks